US008244381B2

(12) United States Patent
Marshall et al.

(10) Patent No.: US 8,244,381 B2
(45) Date of Patent: Aug. 14, 2012

(54) MICROPROCESSOR, SYSTEM FOR CONTROLLING A DEVICE AND APPARATUS

(75) Inventors: Ray Marshall, Abbots Langley (GB); Mike Garrard, Chelmsford (GB); Jeff Loeliger, Newton Meams (GB)

(73) Assignee: Freescale Semiconductor, Inc., Austin, TX (US)

(*) Notice: Subject to any disclaimer, the term of this patent is extended or adjusted under 35 U.S.C. 154(b) by 137 days.

(21) Appl. No.: 12/679,391

(22) PCT Filed: Oct. 4, 2007

(86) PCT No.: PCT/IB2007/054042
§ 371 (c)(1),
(2), (4) Date: Mar. 22, 2010

(87) PCT Pub. No.: WO2009/044233
PCT Pub. Date: Apr. 9, 2009

(65) Prior Publication Data
US 2010/0200088 A1    Aug. 12, 2010

(51) Int. Cl.
G05B 11/01    (2006.01)
G05B 13/02    (2006.01)
G05D 7/00     (2006.01)
(52) U.S. Cl. ............. 700/14; 700/30; 700/282; 701/103
(58) Field of Classification Search ................. 700/9, 10, 700/11, 14, 19, 30, 33, 34, 53, 67, 73, 74, 700/275, 282; 701/103
See application file for complete search history.

(56) References Cited

U.S. PATENT DOCUMENTS
4,799,165 A * 1/1989 Hollister et al. ................ 702/66
(Continued)

FOREIGN PATENT DOCUMENTS
EP    1111222 A2    6/2001
EP    1582725 A1    10/2005

OTHER PUBLICATIONS

"PIC18F8722 Family Data Sheet" Online 2004, Microchip Technology Inc. XP002487890, Retrieved from the Internet: URL: http://www.microchip.com/downloads/en/DeviceDoc/39646b.pdf> (Retrieved on Jul. 11, 2008) pp. 11-30, 161-205, 271-289.

(Continued)

Primary Examiner — Sean Shechtman

(57) ABSTRACT

A microprocessor may include a logic circuit for executing instructions of a data processing application. The microprocessor may have a timer system which includes a clock counter connected to a clock input for receiving a clock signal and counting a number of cycles of the clock signal. A clock comparator may be connected the clock counter and to a timer register in which a timer reference value can be stored. The clock comparator may compare a number of cycles of the clock signal with the timer reference value and generate a timer signal based on the comparison. The timer system may have a timer output for outputting timer signal. The timer system may include a control input for receiving a digital value representing a measured value of a sensed parameter of a device and a control register in which a control reference value can be stored. A control comparator may be connected the control input. The control comparator may compare the digital value with the reference value and generating a device control signal based on the comparison. The timer system may have a control output for outputting the device control signal to an actuator arranged to control the parameter of the device.

17 Claims, 3 Drawing Sheets

U.S. PATENT DOCUMENTS

| | | | | |
|---|---|---|---|---|
| 4,914,566 A | * | 4/1990 | Steutermann | 700/56 |
| 5,233,573 A | | 8/1993 | Bettelheim et al. | |
| 6,745,107 B1 | * | 6/2004 | Miller | 700/282 |
| 2004/0109273 A1 | * | 6/2004 | Honda et al. | 361/90 |

OTHER PUBLICATIONS

International Search Report and Written Opinion correlating to PCT/IB2007/054042 dated Aug. 4, 2008.

* cited by examiner

MICROPROCESSOR, SYSTEM FOR CONTROLLING A DEVICE AND APPARATUS

FIELD OF THE INVENTION

This invention relates to a microprocessor, to a control system and to an apparatus including a control system.

BACKGROUND OF THE INVENTION

Many hard real-time control systems require the precise control of actuators to control a process or plant or machinery. These actuators must be accurately managed, for example to turn on and off at critical times or angles of rotating machines or at specific voltages or currents.

Control systems are known in which an analog application specific integrated circuit is used, which generally provide a fast, and therefore more accurate control loop, those control systems are expensive and inflexible because they cannot be reconfigured to perform another function in another application.

From U.S. Pat. No. 5,233,573, a microcontroller is known which incorporates a digital timer apparatus and a central processing unit (CPU). The digital timer apparatus receives an external signal. Upon a transition of the external signal, the value of a free-running counter driven by a constant frequency clock signal, is loaded into a capture register and causes a pulse accumulator to be incremented. The pulse accumulator is reset periodically by an interval timer. Thus, both the time of a transition and the number of transitions during a certain period of time can be determined. The time of a transition and the number of transitions are used by the CPU to perform a control function.

However, a disadvantage of this prior art system is that, although a CPU is flexible and can be relatively cheap, the CPU is relatively slow which makes the control slow and imprecise.

SUMMARY OF THE INVENTION

The present invention provides a microprocessor, a system for controlling a device and an apparatus as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
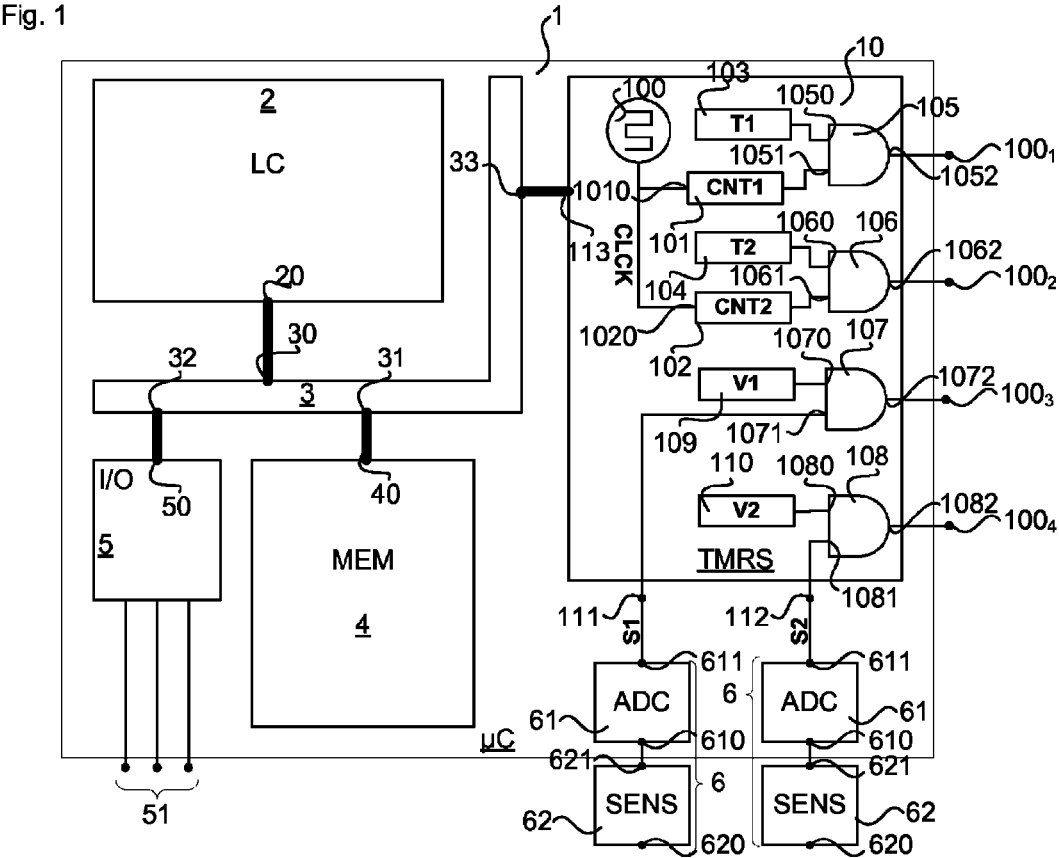
FIG. 1 schematically shows a block diagram of an example of an embodiment of a microprocessor.

Referring to FIG. 1, an example of a microprocessor 1 is shown therein. The microprocessor 1 may include one or more logic circuit(s) (LC) 2 and one or more timer systems 10. The microprocessor 1 may for example be a general purpose microprocessor. Alternatively, the microprocessor 1 may be a microcontroller (µC), such as a controller for an electronic stability control (ESC) system used to modulate braking and traction forces of a vehicle, such as a car, a control system for an engine. The microprocessor 1 may be implemented in any manner suitable for the specific implementation. The microprocessor 1 may for example include, in addition to the logic circuit 2, an input/output interface (I/O) 5 or other components, such as communication interfaces and/or coprocessors and/or analog-to-digital converters and/or clocks and reset generation units and/or voltage regulators and/or memory 4 (such as for instance flash, EEPROM, RAM) and/or error correction code logic and/or other suitable components.

The components, such as the memory 4, the I/O 5 and the timer system 10 may be connected to the logic circuit 2. In the example of FIG. 1, the microprocessor 1 for example includes an internal bus 3 which connects the logic circuit 2 to other components in the microprocessor, such as to the memory 4, the I/O 5 and the timer system 10. In the example of FIG. 1, the logic circuit 2 is connected with an interface 20 to an input/output 30 of the internal bus 3. The memory 4 is connected with an interface 40 to an input/output 31 of the internal bus 3. An interface 50 of the I/O 5 is connected to the logic circuit 2 via the bus 3. The timer system 10 is connected with an interface 113 to an input/output 33 of the internal bus 3 in the example of FIG. 1.

The microprocessor 1 may receive data from and/or output to the world outside the microprocessor. For instance, in FIG. 1 the I/O 5 is connected to input/output contacts 51 of the microprocessor 1, for example to input received from and/or output data to the world outside the microprocessor 1.

The logic circuit 2 may be implemented in any manner suitable for the specific implementation. Although for sake of simplicity, only a single logic circuit 2 is shown in FIG. 1 the microprocessor 1 may include two or more logic circuits, and for instance be a multi-core processor. The logic circuit 2 may for example be a central processing unit (CPU) and/or a coprocessor and/or a digital signal processor and/or an embedded processor.

The logic circuit 2 may, in operation, execute instructions of one or more software applications. The software application may be any type of application suitable for the specific implementation, and for example be a control application for controlling the operation of a physical device and for instance control a part of the vehicle, such as for example an engine or a fuel injection system of an engine.

The logic circuit 2 may for instance be a programmable circuit and may be connected to one or more memories (MEM) 4, in which instructions executable by the logic circuit 2 can be stored, for instance during manufacturing of the logic unit or after manufacturing.

The logic circuit 2 may for instance include one, or more, processor cores. The memory 4 may be connected to the processor core and the processor core may execute the instructions stored in the memory 4. The processor core may for instance include the logic circuitry required to execute program code in the form of machine code. The logic circuit 2 may for instance include one or more of: an instruction decoder, an arithmetic unit, an address generation unit, and a load/store unit.

The timer system 10 may be implemented in any manner suitable for the specific implementation. In the example shown in FIG. 1, the timer system 10 is arranged to operate independent from the logic circuit 2 and is communicatively connected to the logic circuit 2, e.g. via the interfaces 20,113 and the internal bus 3.

As illustrated in FIG. 1, the timer system 10 may have one or more, in this example two, clock counters 101-102 connected to one or more clock inputs 1010,1020 (in the example of FIG. 1, the clock inputs 1010, 1020 are formed by the counter inputs). At the clock input 1010,1020, one or more clock signals may be received. The clock counters 101-102 can count a number of cycles of the respective clock signal. As shown in FIG. 1, the clock counters 101-102 may be connected, via the clock inputs 1010,1020 to a clock 100. For instance, as shown in the example, the clock 100 may be a source of a constant frequency clock signal and the clock counter(s) 101-102 may be up or down counters which output a counter value CNT1,CNT2 which increments or decrements with one unit per clock cycle.

The timer system 10 may include one or more clock comparators 105-106 connected to the clock counter(s) 101,102. Each of the clock comparators 105, 106 may also be connected to one or more timer registers 103,104 in which one or more timer reference values T1,T2 can be stored. In the example of FIG. 1, a counter input $1051,1061$ of the comparators 105,106 is connected to a respective one of the clock counters 101,102 while the respective timer register 103,104 is connected to a reference input 1050,1060 of a comparator 105,106. A comparator output 1052,1062 is connected to a timer output $100_1,100_2$ of the timer system 10.

The comparator 105,106 may compare the value presented at the counter input 1051,1061, i.e. the counter value CNT1, CNT2 (and hence the counted number of cycles of the clock signal CLCK), with the value presented at the reference input 1050,1060, i.e. with the timer reference value T1,T2. The comparator 105,106 may generate one or more timer signals based on the comparison and output the timer signal at a timer output $100_1,100_2$ of the timer system 10.

The clock comparator(s) 105,106 may for example output a binary signal (e.g. a binary zero) which has a first value during a period of time the counter value CNT1,CNT2 is below the respective reference value T1,T2 and a second value (e.g. a binary one) when the counter value CNT1,CNT2 is higher than the reference value T1,T2. For example, the comparator may operate as can be described with the pseudo code:

---
if CNT<T then timer signal=low
else timer signal=high
---

However, the timer signals may also be of a different type and the comparator may, for example, output a short pulse at the point in time the counter value CNT1,CNT2 becomes equal to the reference value T1,T2. For example, the comparator may operate as can be described with the pseudo code:

---
if CNT==T then timer signal=high
else if (CNT<T or CNT>T) timer signal=low
---

The comparator 105,106 may transmit the timer signal to a timer output $100_1,100_2$. In the example of FIG. 1, for instance, the timer signal presented at a comparator output 1052,1062 can be outputted, via the timer output $100_1,100_2$ to which the respective comparator 105,106 is connected, to the world outside the microprocessor 1. However, one or more of the timer outputs $100_1,100_2$ may, also or alternatively, be connected to a component inside the microprocessor 1, such as to the logic circuit 2, in order to provide timing information to the respective component for example.

As shown in FIG. 1, the timer system 10 may include one or more control inputs 111,112. One or more of the control comparators 107,108 may be connected the control input(s) 111,112. At the control inputs 111,112 respective digital values s1,s2 may be presented. As explained below in more detail, the digital values s1,s2 may represent the measured values of one or more sensed parameter of one or more devices 7.

The timer system 10 may include one or more control registers 109,110 in which one or more control reference values V1,V2 can be stored. The comparators 107,108 may compare the digital value s1,s2 with the reference value V1,V2 and generate one or more device control signals based on the comparison. The device control signals may then be outputted at one or more control outputs $100_3,100_4$, for example to an actuator 70 arranged to control the parameter of the device 7.

The control inputs 111,112 may, for example, be connected to a digital value input 1071,1081 of the comparator 107,108 and the control registers 109,110 may, for example, be connected to a reference value input 1070,1080. The comparator 107,108 may compare the value presented at the digital value input 1071,1081, with the value presented at the reference input 1070,1080 and hence compare the digital value s1,s2, with the reference value v1,v2. The comparator 107,108 may present the device control signals at a comparator output 1072,1082 which is connected to a respective one of the control outputs $100_3,100_4$ of the timer system 10.

Thus, the microprocessor 1 can be used to provide a sensor-actuator control loop. Hence, a flexible and relatively cheap control system may be obtained. The control system may for example be reconfigured by simply adjusting the reference value v1,v2. Furthermore, because the control signal is generated in the timer system, the control loop can be faster than a control loop which includes the logic circuit 2. Also, the control system can be implemented few components, and may therefore be of a simple design.

The control outputs $100_3,100_4$ may for example output the device control signal to the world outside the microprocessor 1, such as to a device actuator 70 as is explained in more detail with reference to FIG. 2. However, one or more of the control outputs $100_3,100_4$ of the timer system 10 may, also or alternatively, be connected to a component inside the microprocessor 1, in order to provide information about the device to the respective component. The component inside the microprocessor 1 may for example be the logic circuit 2.

The control comparator 107, 108 may be arranged to generate one or more first binary signals when the digital value s1,s2 is below the control reference value v1,v2 and to generate one or more second binary signals opposite to the first binary signal when the digital signal s1,s2 exceeds the control reference value v1,v2. For example, the control comparator 107,108 may operate as can be described with the pseudo code:

```
if s<v,
   then control signal=low
   else control signal=high
```

The microprocessor may have any suitable number of control inputs, comparators and outputs. As illustrated in FIG. 1, the microprocessor 1 may for example include two or more control inputs 111,112 for receiving respective digital values. In the example of FIG. 1, each control comparator 107,108 is connected to a separate control input 111 resp. 112 and hence is arranged to compare the digital value received at one selected control input with the reference value. However, a control comparator 107,108 may also be connected to two or more control inputs 111,112, for example via a time multiplexer and compare digital value from two or more control inputs 111,112.

As shown in FIG. 1, the microprocessor 1 may include two or more control outputs $100_3$-$100_4$, each for outputting one or more respective control signals. For example, the control outputs $100_3$-$100_4$ may be connected two or more actuators for instance for actuating different parameters of a device or for two or more different devices. However, the microprocessor 1 may include a single control output, for instance in case only a single actuator is to be controlled.

As shown in FIG. 1, the microprocessor 1 may include an analog-to-digital converter (ADC) 61. The ADC 61 may generate one or more digital signals, such as binary signals or other discrete signals, representing one or more values of one or more parameter of an analog signal, such as the amplitude of the analog signal.

The analog signal may for example be a sensor signal received from a sensor 62 which senses a parameter of a device. The ADC 61 may for example have an analog input 610 at which the analog signal may be received and which is connected to an output 621 of a sensor 62, which together with the ADC 61 forms a digital sensor system 6. The sensor 62 may for example have a sensing input 620 at which a physical input stimulus (such as radiation, sound or other suitable stimulus) may be received. The sensor 62 may output a signal in response, such as an electrical signal or other type of signal suitable to be inputted to the ADC 61. It should be noted that in the example of FIG. 1, the ADC 61 is shown within the boundaries of the microprocessor 1. However, the ADC 61 may be provided as a device separate from the device in which the logic circuit 2 and the timer system 10 are provided, and for example be implemented as an integrated circuit separate from, but connected to (and in the same package as) an integrated circuit in which the logic circuit 2 and the timer system 10 are implemented. The ADC 61 may have one or more digital outputs 611 at which the digital signal may be presented. The digital output 611 may for example be connected to the control input 111,112, and hence be inputted to the control comparator 107,108 connected to the respective control input 111,112.

Hereinafter an electromagnetic fuel injection system is described by way of an example of an apparatus including a control system. However, a control system may used to control other types of apparatus.

Figure 2:
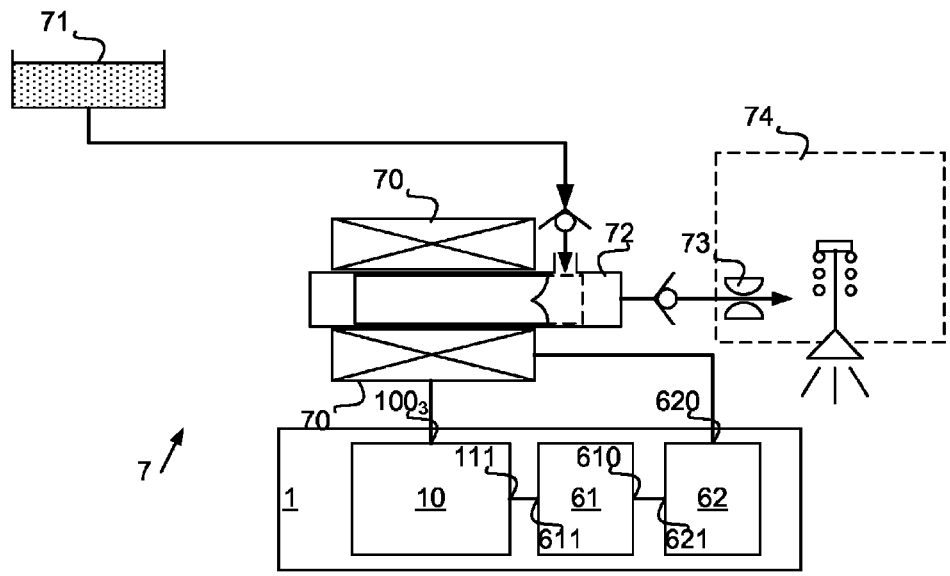
FIG. 2 schematically shows a block diagram of a fuel injection system.

FIG. 2 schematically illustrates a configuration of a fuel injection system 7 (hereinafter, referred to as an "electromagnetic fuel injection system") using an electromagnetic fuel injection pump that pressurizes and injects fuel by itself, as distinct from a conventional fuel injection apparatus or fuel injection system that injects fuel pressurized and provided in/from a fuel pump or regulator.

As shown in FIG. 2, the electromagnetic fuel injection system may include a plunger pump 72, which pressurizes and feeds fuel from a fuel tank 71 into an inlet orifice nozzle 73. In the shown example, the plunger pump 72 is electromagnetically driven pump which comprises one or more electromagnets 70 via which the operation of the pump 72 can be controlled.

The inlet orifice nozzle 73 may, as shown, have an orifice portion through which the fuel is passed with a predetermined pressure. The fuel may be fed into the orifice portion from the plunger pump 72. An injection nozzle 74 is positioned, in direction of the fuel flow, downstream of the inlet orifice nozzle 73. The injection nozzle 74 may inject the fuel passed through the inlet orifice nozzle 73 with a pressure higher than a predetermined value to an intake passage (e.g. of an engine).

As shown, a microprocessor 1 may be arranged to control the operation of the plunger pump 72 and hence the operation of the fuel injection system. The microprocessor 1 may for example output a control signal to the plunger pump 72 based on one or more sensed operational parameter of, for instance, the engine or the coil. The sensed operational parameter may for example include the amount current flowing through one or more of the electromagnets 70 of the plunger pump 72. In the example of FIG. 2, for instance, a control input 111 of the microprocessor 1 is connected to a electromagnet 70, via a line-up of an ADC 61 and a sensor 62, in order to receive a digital value representing the amount of current flowing through the electromagnet 70. The timer system 10 in the microprocessor 1 may compare the digital value with a reference value and output a control signal based on the comparison. The control signal may be outputted at the output $100_3$ in order to control a parameter of the apparatus, i.e. in this example of the plunger pump 72. The control signal may control any suitable parameter and for example enable or disable the current through the electromagnet 70 (and hence the magnetic field generated by the electromagnet 70).

Figure 3:
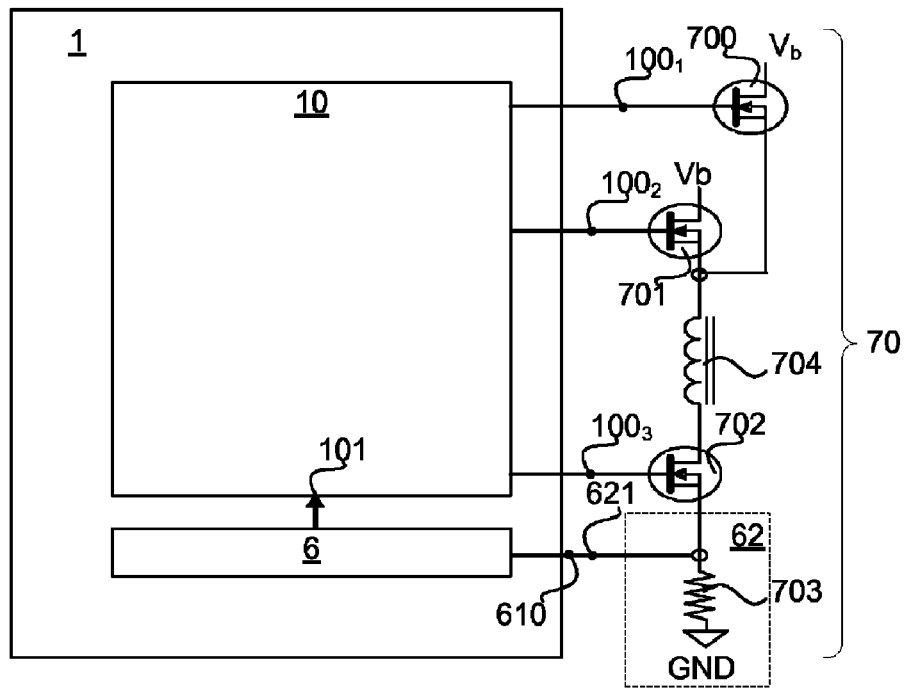
FIG. 3 schematically shows a block diagram of an example of an embodiment of a system for controlling a device.

Referring to FIG. 3, an example of a control system 7 is shown therein. In this example, the control system 7 is an on-off control system which controls a magnetic coil 704. The coil 704 may for example be used as the electromagnet in the example of FIG. 2 or in another system such as an ignition system (in which case the coil 704 may for example be a spark ignition coil) or an electric motor. However, it will be apparent that the control system 7 may be implemented in any suitable manner and be used to control other devices or parameters. In the example of FIG. 3, a parameter of a device is controlled based on a sensed value of the same parameter, and hence the control system 7 forms a sensor-actuator feedback system. However, it will be apparent that the sensed parameter of a device may also be used to control another parameter of that device or to control a parameter of another device.

In the example of FIG. 3, the magnetic coil 704 is connected with one side to a voltage source Vb and with another side to ground GND. A current can flow through the magnetic coil 704, from the voltage source Vb to ground GND, and hence an magnetic field can be generated. In the shown example, switches 700-702 are provided which can enable or disable the current through the magnetic coil and hence enable or disable the magnetic field, as explained below in more detail.

In the shown example the sensor 62 can detect the amount of current I flowing through the magnetic coil 704. However, it will be apparent that the sensor 62 may in addition or alternatively sense another parameter. The sensor 62 includes in this example a current detecting resistor 703 which is connects the low voltage side of the magnetic coil 704 to ground GND. The resistor 703 connects the magnetic coil 704 to ground GND. Hence, when a magnetic field is generated, a current flows through the resistor 703 which is proportional to the current I flowing through the magnetic coil 704. The voltage difference between the coil side of the resistor 73 and ground GND is therefore proportional to the current I flowing through the magnetic coil 704 and hence forms a measure for current I. In the example, the resistor 73 forms the only path to ground for the current through the magnetic coil and hence the voltage difference is directly proportional to the current I. As shown in FIG. 3, the coil side node of the resistor 703 is connected to the analog input 610 of the ADC 61 and hence the voltage difference is inputted to the ADC 61 as the analog signal.

In the example of FIG. 3, the sensing resistor 703 is connected to the low voltage side of the magnetic coil 704 via a control switch 702. In this example, the sensing resistor, the control switch 702 and the magnetic coil 704 form a linear chain. Hence, the current through the resistor 703 is, except for leakage currents in the switch 702, the same as the current through the magnetic coil 704 and the current flowing through the magnetic coil 704 can be controlled via the switch 702. As shown, the control switch 702 is connected to the control output $100_3$ of the microprocessor 1. In this example, the control switch 702 is a Field Effect Transistor (FET) connected with it's current terminals to the magnetic coil 704 and to the resistor 703 respectively and connected with its control terminal (i.e. the gate) to the control output $100_3$. By controlling the voltage Vg provided to the control terminal of the switch 702, the current I flowing through the FET from the one current terminal to the other current terminal can be controlled. For example, a current flow can be allowed or be blocked, and hence the coil can be switched on or off.

Hence, the switch 702 forms an actuator which can actuate a parameter, in this example the current through the magnetic coil. The control input of the switch 702 thus forms an actuator control input which is connected to the control output $100_3$ of the microprocessor 1.

The control system 7 may also include one or more actuators which are controlled based on the period of time instead of the sensed parameter. In the example of FIG. 3, for instance, the coil 704 is connected to a power supply $V_b$ via a switch 701. The switch 701 can control the power supplied to the coil 704. A boost switch 700 connects the node between the switch 701 and the coil 704 to a boost supply $V_b$, to accelerate the transition of the switch 701 from open to closed (or vice versa). As shown, control terminal of the switches 700,701 are connected to the clock outputs $100_1$, $100_2$ of the timer system 10. By controlling the voltage Vg provided to the control terminal of the respective switch 702, the current I flowing through the switch from the one current terminal to the other current terminal can be controlled. For example, a current flow can be allowed or be blocked. Thus, the coil can be electrically connected or electrically disconnected from the power supply Vb.

Figure 4:
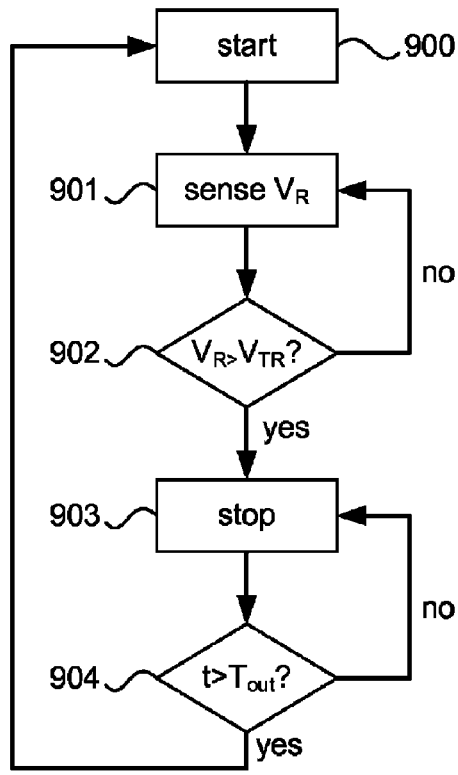
FIG. 4 schematically shows a flow chart of an example of a method for controlling an apparatus.
Figure 5:
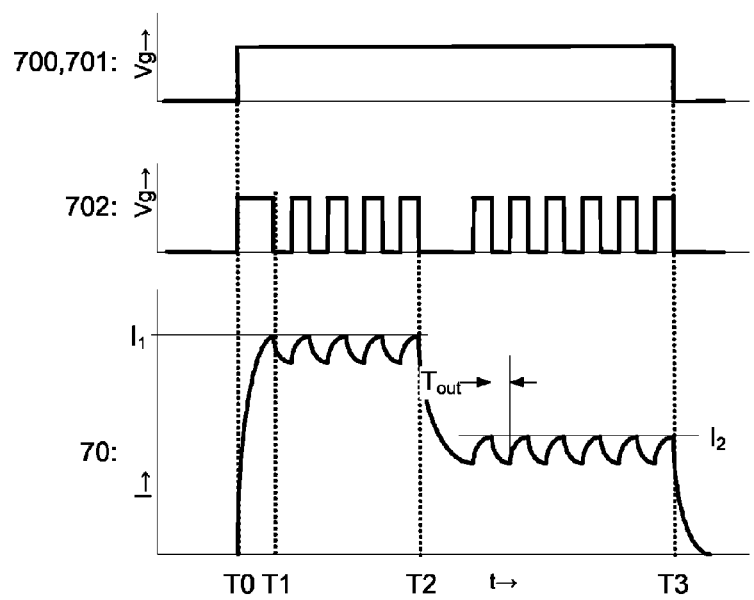
FIG. 5 schematically illustrates the timing of components of the example of FIG. 3

Referring to FIGS. 4 and 5, the example shown in FIG. 3 may for example perform a process as follows. As illustrated in FIG. 4 with block 900, the process may be started by enabling the electrical connection between the power supply Vb and the magnetic coil 704. For instance, the switches 700,701 may be connected to the clock comparators 105-106. Thus, the power side switches 700,701 may be opened and closed according to a period of time set by the timer reference value T1,T2, as illustrated in FIG. 5. The timer reference values T1,T2 in the timer registers 103,104 may be set such that the clock comparator(s) 105-106 output a high signal which closes the switch 700,701 during a period from the start (at T0) to an end T3, thus enabling operation of the magnetic coil during the period of time (shown from T0 to T3 in FIG. 5).

As illustrated in FIG. 4 with step 901, a parameter, e.g the voltage $V_R$ over the resistor 703, may be sensed and as shown with step 902 the sensed parameter may be compared with a reference value $V_{TR}$ stored in the control register 109,110. When the voltage $V_R$ exceeds the reference value $V_{TR}$, the current flow through the magnetic coil 704 may be stopped, as e.g. shown at time T1 in FIG. 5. The current flow may for example be stopped for a predetermined period of time $T_{out}$, and then be switched on again, as indicated with step 904 in FIG. 4, for example by opening and closing the switch 702, for example be applying a suitable voltage Vg at the control terminal, e.g. the gate, thereof, as shown in FIG. 5. As shown in FIG. 5, different reference values may be used at different points in time. For example, during a first period of time (from T0 to T2 in FIG. 5) a first reference value (corresponding to a current $I_1$) may be set for the control reference value whereas during a second period of time (from T2 to T3 in FIG. 5) a second reference value (corresponding to a current $I_2$) may be set.

Figure 6:
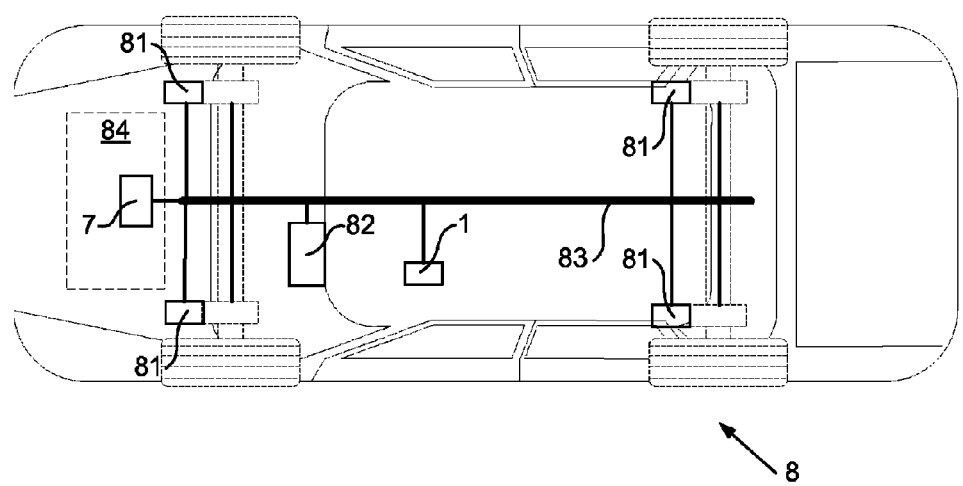
FIG. 6 schematically shows an example of an embodiment of an apparatus including a system for controlling a device in the apparatus.

Referring to FIG. 6, an example of an apparatus is shown therein. The example shown in FIG. 1, is a motorised vehicle, and more in particular is a car 8. The car 8 may include a microprocessor 1, which as shown may for example control braking systems 81 or a fuel injection system 7 which can inject fuel into a combustion engine 84. As shown, the microprocessor 1 may for example be connected to the braking systems 81, the fuel injection system 7 or other components such as a dashboard controller 82 via a suitable communication network 83, such as a FlexRay network or other suitable system.

In the foregoing specification, the invention has been described with reference to specific examples of embodiments of the invention. It will, however, be evident that various modifications and changes may be made therein without departing from the broader spirit and scope of the invention as set forth in the appended claims. For example, the sensor may include any suitable type of sensor such as a current sensor, a voltage sensor, an angle sensor. Also, for example the sensor may be a temperature sensor, which is for example integrated on the die on which the microprocessor 1 is provided. When the sensed temperature exceeds a temperature threshold set in the control register, a suitable action may be taken, such as the generation of an interrupt which is sent to the logic circuit or switching the logic circuit to a lower power mode, in order to limit further temperature rise.

Furthermore, the devices may be physically distributed over a number of apparatuses, while functionally operating as a single device. For example, the components of the microprocessor 1 may be provided on two or more dies which are contained into the same package. Also, devices functionally forming separate devices may be integrated in a single physical device. For example, the switches 700-702 in the example of FIG. 3 may be integrated in the microprocessor and be connected to a coil via suitable pins of the microprocessor.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A microprocessor, comprising:
a logic circuit for executing instructions of a software application, and a time system, said time system including:
a clock input for receiving a clock signal;
a clock counter connected to said clock input for counting a number of cycles of said clock signal;
a clock comparator connected said clock counter and to a timer register in which a timer reference value can be stored, for comparing a number of cycles of said clock signal with said timer reference value and generating a timer signal based on said comparison; and
a time output for outputting timer signal;
a control input for receiving a digital value representing a measured value of a sensed parameter of a device;
a control register in which a control reference value can be stored;
a control comparator connected said control input, for comparing said digital value with said control reference value and generating a device control signal based on said comparison; and
a control output for outputting said device control signal to an actuator arranged to control said parameter of said device;
an analog to digital converter for generating a digital signal representing a value of a parameter of an analog signal, said parameter of said analog signal representing said sensed parameter, said analog-to-digital converter having an analog input for receiving said analog signal and a digital output for outputting said digital value, said digital output being connected to said control input.

2. The microprocessor, as claimed in claim 1, including at least two control inputs for receiving respective digital values, and wherein said control comparator is arranged to compare at least one selected digital value received at a selected control input with said control reference value.

3. The microprocessor, as claimed in claim 1, including at least two control outputs, each for outputting a respective control signal.

4. The microprocessor, as claimed in claim 1, wherein said control comparator is arranged to generate a first binary signal when said digital value is below said control reference value, and to generate a second binary signal opposite to said first binary signal when said digital value exceeds said control reference value.

5. A system for controlling a device, including:
a sensor for sensing a sensed parameter of said device;
a microprocessor comprising:
a logic circuit for executing instructions of a software application, and a time system, said time system including:
a clock input for receiving a clock signal;
a clock counter connected to said clock input for counting a number of cycles of said clock signal;
a clock comparator connected said clock counter and to a timer register in which a timer reference value can be stored, for comparing a number of cycles of said clock signal with said timer reference value and generating a timer signal based on said comparison; and
a time output for outputting timer signal;
a control input for receiving a digital value representing a measured value of said sensed parameter of said device, said microprocessor being connected with said control input to said sensor;
a control register in which a control reference value can be stored;
a control comparator connected said control input, for comparing said digital value with said control reference value and generating a device control signal based on said comparison; and
a control output for outputting said device control signal to an actuator arranged to control said parameter of said device;
an analog to digital converter for generating a digital signal representing a value of a parameter of an analog signal, said parameter of said analog signal representing said sensed parameter, said analog-to-digital converter having an analog input for receiving said analog signal and a digital output for outputting said digital value, said digital output being connected to said control input.

6. The system as claimed in claim 5, further including an actuator for actuating said parameter of said device, said actuator having an actuator control input connected to said control output of said microprocessor.

7. The system as claimed in claim 5, wherein said actuator includes a fuel injector.

8. The system as claimed in claim 5, wherein said sensor includes one or more of: current sensor, voltage sensor, angle sensor.

9. The system as claimed in claim 6, wherein said actuator includes a fuel injector.

10. The system as claimed in claim 6, wherein said sensor includes one or more of: current sensor, voltage sensor, angle sensor.

11. The system as claimed in claim 7, wherein said sensor includes on or more of: current sensor, voltage sensor, angle sensor.

12. The microprocessor as claimed in claim 2, including at least two control outputs, each for outputting a respective control signal.

13. The microprocessor as claimed in claim 2, wherein said control comparator is arranged to generate a first binary signal when said digital value is below said control reference value, and to generate a second binary signal opposite to said first binary signal when said digital value exceeds said control reference value.

14. The microprocessor as claimed in claim 3, wherein said control comparator is arranged to generate a first binary signal when said digital value is below said control reference value, and to generate a second binary signal opposite to said first binary signal when said digital value exceeds said control reference value.

15. The system as claimed in claim 5, said microprocessor including at least two control inputs for receiving respective digital values, wherein said control comparator is arranged to compare at least one selected digital value received at a selected control input with said control reference value.

16. The system as claimed in claim 5, said microprocessor including at least two control outputs, each for outputting a respective control signal.

17. The system as claimed in claim 5, wherein said control comparator is arranged to generate a first binary signal when said digital value is below said control reference value, and to generate a second binary signal opposite to said first binary signal when said digital value exceeds said control reference value.

* * * * *